US010573857B2

(12) United States Patent
Choi et al.

(10) Patent No.: US 10,573,857 B2
(45) Date of Patent: Feb. 25, 2020

(54) BATTERY PACK (71) Applicant: LG CHEM, LTD., Seoul (KR)

(72) Inventors: Yang-Kyu Choi, Daejeon (KR); Seong-Tae Kim, Daejeon (KR); Jun-Yeob Seong, Daejeon (KR); Hyuk An, Daejeon (KR); Sang-Yoon Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 221 days.

(21) Appl. No.: 15/532,918

(22) PCT Filed: Jan. 12, 2016

(86) PCT No.: PCT/KR2016/000300
§ 371 (c)(1),
(2) Date: Jun. 2, 2017

(87) PCT Pub. No.: WO2016/140431
PCT Pub. Date: Sep. 9, 2016

(65) Prior Publication Data
US 2017/0331081 A1 Nov. 16, 2017

(30) Foreign Application Priority Data
Mar. 5, 2015 (KR) .................. 10-2015-0030975

(51) Int. Cl.
*H01M 2/10* (2006.01)
(52) U.S. Cl.
CPC ........... *H01M 2/1005* (2013.01); *H01M 2/10* (2013.01); *H01M 2/1077* (2013.01); *H01M 2220/20* (2013.01)

(58) Field of Classification Search
CPC .. H01M 2220/20; H01M 2/10; H01M 2/1005; H01M 2/1077
See application file for complete search history.

(56) References Cited

U.S. PATENT DOCUMENTS

| 4,029,248 A | 6/1977 | Lee |
| 5,283,137 A * | 2/1994 | Ching .................. H01M 2/043 16/444 |

(Continued)

FOREIGN PATENT DOCUMENTS

| JP | 10-40894 A | 2/1998 |
| JP | 10-508423 A | 8/1998 |

(Continued)

OTHER PUBLICATIONS

International Search Report issued in PCT/KR2016/000300 (PCT/ISA/210), dated Apr. 29, 2016.

*Primary Examiner* — Lingwen R Zeng
(74) *Attorney, Agent, or Firm* — Birch, Stewart, Kolasch & Birch, LLP (57) ABSTRACT

The present disclosure discloses a battery pack suitable for preventing simultaneous separation of both ends of a handle unit from an upper case during transportation of a lower case and the upper case that are laminated sequentially. The battery pack according to the present disclosure includes the lower case and the upper case stacked sequentially to encase a battery module, wherein the upper case includes a housing and a handle unit relatively rotated with respect to the housing to be seated on the housing, and the handle unit has shaft hooks that are penetrated by the rotation supporting shafts of the housing and that are each rotary-coupled to each of the rotation supporting shafts in different angles.

18 Claims, 5 Drawing Sheets

(56) References Cited

U.S. PATENT DOCUMENTS

| | | | |
|---|---|---|---|
| 5,637,420 A | 6/1997 | Jones, Jr. et al. | |
| 9,203,062 B2 | 12/2015 | Andersen | |
| 2010/0136425 A1* | 6/2010 | Gau | H01M 2/1005 |
| | | | 429/187 |

FOREIGN PATENT DOCUMENTS

| | | |
|---|---|---|
| JP | 2008-32349 A | 2/2008 |
| JP | 2010-251127 A | 11/2010 |
| KR | 20-0196817 Y1 | 9/2000 |
| KR | 10-2005-0041300 A | 5/2005 |
| KR | 20-2008-0006337 U | 12/2008 |
| KR | 10-2013-0093476 A | 8/2013 |
| KR | 10-2014-0050200 A | 4/2014 |
| KR | 10-2014-0052180 A | 5/2014 |

* cited by examiner

BATTERY PACK

TECHNICAL FIELD

The present application claims the benefit of Korean Patent Application No. 10-2015-0030975 filed on Mar. 5, 2015, with the Korean Intellectual Property Office, the disclosure of which is incorporated herein by reference in its entirety.

The present disclosure relates to a battery pack suitable for firmly maintaining the coupling of components of a structure during transportation to prevent separation of the components.

BACKGROUND ART

Recently, vehicles are manufactured based on studies conducted to secure driving force using internal combustion engines and/or electric motors, in order to reduce air pollution from exhaust gas of vehicles. Accordingly, the vehicles have evolved in the order of hybrid vehicles, plug-in hybrid vehicles and electric vehicles. In this case, the hybrid vehicles and plug-in hybrid vehicles have an internal combustion engine, an electric motor and a battery pack, and the electric vehicles have an electric motor and a battery pack, but not an internal combustion engine.

Accordingly, the battery pack has evolved together with hybrid vehicles, plug-in hybrid vehicles and electric vehicles. The battery pack is configured to be chargeable from outside an electric vehicle. The battery pack has a pack case and a battery module, and the pack case comprises an upper case and a lower case, thereby encasing the battery module. The battery module has battery cells and cartridges. The cartridge is configured to accommodate one or more battery cells. Here, the battery module is configured to physically secure the cartridges into one component.

The battery module is encased by the lower case and the upper case, and is transported using a handle that is fixated to the upper case or detachably attached to the upper case. When the handle is fixated to the upper case, the handle is applied with external force intermittently or repeatedly through the pack case during the life expectancy of use of the battery pack, thereby generating crack in a contact portion of the upper case due to stress. The crack introduces foreign substance from outside towards inside the pack case. The foreign substance induces electrical short-circuit of the battery module.

When the handle is detachably coupled to the upper case, the handle is coupled to the upper case only in one direction on the upper case, and thus, during transportation of the battery pack, the handle is separated from the upper case due to severe shaking of the lower and upper cases, or due to excessive bending of the handle from the lower and upper cases due to the transporting posture of a transporting person. Separation of the handle from the upper case induces crushing of the lower case through collision of a peripheral structure and the pack case, and indirectly impacts the battery module through the crushing of the lower case.

The impact on the battery module keeps the battery module from maintaining the electrical property that it initially intended. Therefore, numerous studies are being conducted to prevent the introduction of foreign substance from outside towards inside the pack case and to prevent the crushing of the lower case. One example of the studies mentioned above is disclosed in 'Battery Pack' of Japanese Patent Publication No. 2010-251127 (laid-open on Nov. 4, 2010). The battery pack has battery holders, portable handles and cases. The battery holders accommodate batteries that are stacked sequentially.

The portable handle is formed in a bow shape, and has connecting shafts and flanges at both ends. The connecting shaft protrudes from the end towards the inside of the bow. The flange protrudes from the end towards the outside of the bow such that it corresponds to the connecting shaft. The cases accommodates the battery holders in a central region, and is coupled to the portable handle at an upper side to be screw-coupled through an edge. Here, after the screw-coupling of the cases, the portable handle rotates relatively with respect to the cases through space between the cases at the upper side.

However, since the cases must be screw-coupled so that the portable handle is mounted onto the cases, the assembly process of the portable handle and the cases is very complicated, thereby increasing the manufacturing cost per unit of the battery pack.

DISCLOSURE

Technical Problem

The present disclosure is designed to solve the problems of the related art, and therefore the present disclosure is directed to providing a battery pack suitable for preventing simultaneous separation of a handle unit from an upper case during transportation of a lower case and the upper case that are stacked sequentially, and for simplifying the assembly process of the upper case and the handle unit.

Technical Solution

In one aspect of the present disclosure, there is provided a battery pack including a lower case and an upper case stacked sequentially to encase a battery module, wherein the upper case includes a housing and a handle unit relatively rotated with respect to the housing to be seated on the housing, the housing has rotation supporting shafts each disposed on edges facing each other, and a landing lane formed along a seated shape of the handle unit starting from a direct periphery of the rotation supporting shafts, and the handle unit has shaft hooks that are penetrated by the rotation supporting shafts on the landing lane and that are each rotary-coupled to each of the rotation supporting shafts in different angles.

According to the present disclosure, the rotation supporting shafts may be fixated to the housing.

Preferably, each of the rotation supporting shafts may be disposed on surfaces each facing a direction opposite to the housing.

In one aspect, each of the rotation supporting shafts may protrude as a cylinder from the housing towards a side portion of the housing, and have a protrusion on a round surface of the cylinder at an opposite side of the housing.

In another aspect, the protrusion may protrude from the rotation supporting shaft towards an upper portion of the housing.

According to the present disclosure, the landing lane may include a line groove of the housing in a central region, and may be formed in a hook shape having a straight line surface connected to the line groove at the edge and a semi-circular surface extending from the straight line surface and surrounding the rotation supporting shaft.

In one aspect, the housing may have a semi-circular sync groove in a direction perpendicular to an extending direction of the landing lane such that it communicates with a central region of the landing lane on a periphery of the landing lane.

According to the present disclosure, each of the shaft hooks may have a shaft insertion hole and a shaft outer protrusion hole arranged sequentially from the housing at an end.

Preferably, the shaft insertion hole may include an insertion hole that accommodates a cylinder forming a portion of the rotation supporting shaft, and an opening that accommodates a protrusion disposed on a round surface of the cylinder.

In one aspect, the insertion hole may have a smaller diameter on a periphery of the opening than in the shaft outer protrusion hole.

In another aspect, the insertion hole have communication with the shaft outer protrusion hole in a diameter direction through the opening.

Here, the shaft outer protrusion hole may form a step difference with the insertion hole on a periphery of the opening.

In another aspect, the opening may have a same width in the shaft hooks.

In another aspect, the opening of the shaft insertion hole may be arranged in different positions along the edge of the shaft outer protrusion hole in one shaft hook and in the remaining shaft hook.

In another aspect, the protrusion may rotate along a step difference between the insertion hole and the shaft outer protrusion hole.

Meanwhile, the handle unit may have a 'U' letter shape along the landing lane.

According to the present disclosure, the housing may include a snap groove disposed at a same level as the rotation supporting shaft, and the handle unit may include a snap protrusion coupled to the snap groove in the shaft hook.

According to the present disclosure, the housing may include a rotation stopper on the landing lane below the rotation supporting shaft, the shaft hook may include a ring unit surrounding the rotation supporting shaft at an end and a shoulder protrusion on a periphery of the ring unit, and the shoulder protrusion may contact the rotation stopper by spacing of the handle unit from the landing lane.

According to the present disclosure, the shaft hook may further include a stabilizing unit on a periphery of the ring unit at an opposite side to the shoulder protrusion, and may contact the landing lane through the stabilizing unit on a periphery of the rotation supporting shaft.

According to the present disclosure, the handle unit may include a grip unit on a central region in order to improve a sense of gripping.

Advantageous Effects

The battery pack according to the present disclosure may prevent simultaneous separation of both ends of the handle unit from the upper case during transportation since each of the both ends of the handle unit are rotary-coupled in different angles to the rotation supporting shafts of the upper case, in the lower case and upper case that are stacked sequentially.

The battery pack according to the present disclosure uses only fit-coupling and rotary-coupling of the upper case and the handle unit in the process of mounting the handle unit onto the upper case, and may thus reduce the manufacturing cost per unit due to the simple assembly process of the upper case and the handle unit.

The battery pack according to the present disclosure prevents separation of the handle unit from the upper case as much as possible during transportation to prevent collision of the lower case and/or upper case to the peripheral structure beforehand, and thus the electrical property of the battery module that was initially intended may be continuously maintained.

DESCRIPTION OF DRAWINGS

The accompanying drawings illustrate a preferred embodiment of the present disclosure and together with the detailed descriptions below, serve to provide further understanding of the technical spirit of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, and not intended to limit the scope of the disclosure, so it should be understood that other equivalents and modifications could be made thereto without departing from the spirit and scope of the disclosure.

In the embodiments disclosed hereinafter, a battery cell refers to a lithium secondary battery. A lithium secondary battery as used herein encompasses a secondary battery in which lithium ions act as operating ions and thereby inducing electrochemical reaction in a positive electrode and a negative electrode during charging and discharging. However, the present disclosure is obviously not limited to the types of batteries.

Figure 1:
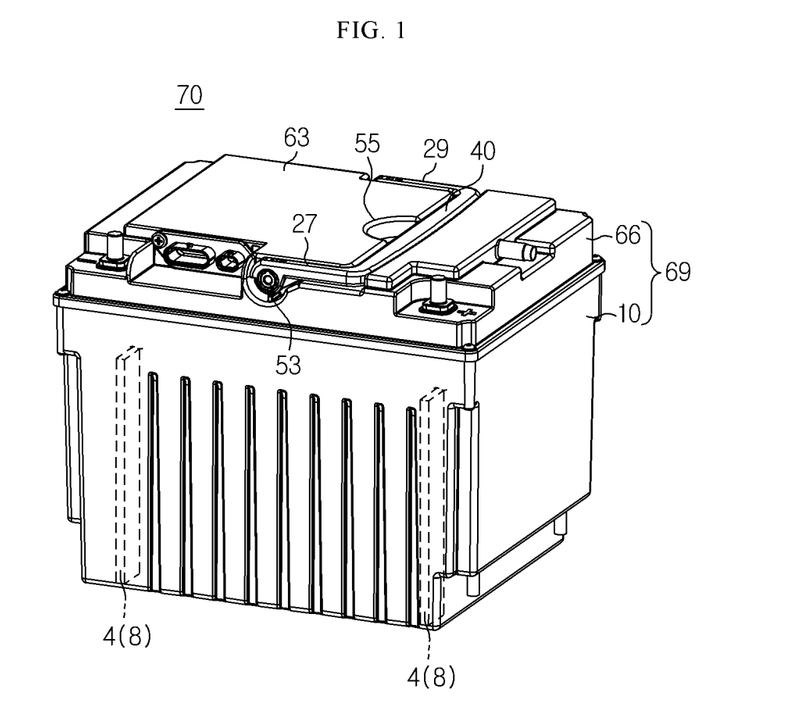
FIG. 1 is a perspective view illustrating a battery pack according to an embodiment of the present disclosure.

FIG. 1 is a perspective view illustrating a battery pack according to an embodiment of the present disclosure.

Referring to FIG. 1, the battery pack 70 according to the present disclosure includes a battery module 8 and a pack case 69. The battery module 8 is encased by the pack case 69. The battery module 8 includes cartridges 4 and a battery cell (not illustrated in the drawings). Preferably, the cartridge 4 accommodates at least one battery cell. In one aspect, the battery module 8 has a plurality of cartridges 4.

The pack case 69 comprises a lower case 10 and an upper case 66 that are stacked sequentially. The lower case 10 accommodates the battery module 8. The upper case 66 includes a housing 63 and a handle unit 40. The housing 63 includes rotation supporting shafts 53 and a sync groove 55. The rotation supporting shafts 53 are fixated to the housing 63.

More specifically, one rotation supporting shaft 53 protrudes from the housing 63 towards one side at an edge of the housing 63, and the remaining rotation supporting shaft 53 protrudes from the housing 63 towards another side at the edge of the housing 63. Here, the rotation supporting shafts 53 are disposed on a same horizontal line in the housing 63. The sync groove 55 is formed in a semi-circular shape, and is opened towards the handle unit 40.

The handle unit 40 is formed in a 'U' letter shape, and includes shaft hooks 27, 29 each rotary-coupled to each of the rotation supporting shafts 53.

Figure 2:
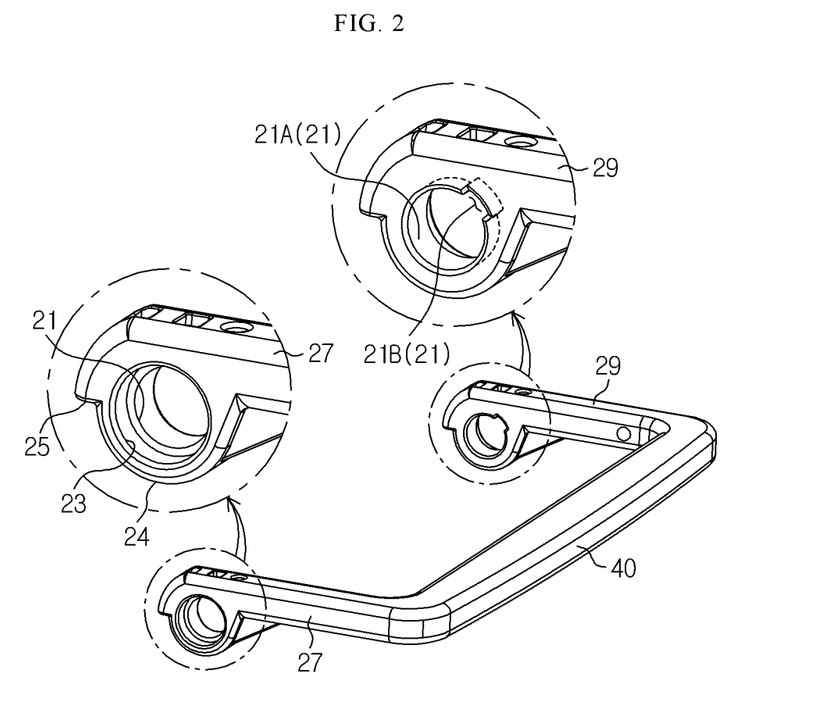
FIG. 2 is a perspective view illustrating in detail a handle unit in FIG. 1.

FIG. 2 is a perspective view illustrating in detail the handle unit in FIG. 1. Referring to FIG. 2, on the upper case (66 in FIG. 1), the handle unit 40 includes the shaft hooks 27, 29 facing each other. Each of the shaft hooks 27, 29 includes, at its end, a ring unit 24 that surrounds the rotation supporting shaft (53 in FIG. 1) of the upper case 66, and a shoulder protrusion 25 on a periphery of the ring unit 24. The ring unit 24 includes a shaft insertion hole 21 and a shaft outer protrusion hole 23 that are arranged sequentially from the housing 63 of the upper case 66.

More specifically, the shaft insertion hole 21 and the shaft outer protrusion hole 23 are arranged sequentially from a region between the shaft hooks 27, 29 towards an opposite side of that region. The shaft insertion hole 21 includes an insertion hole 21A that accommodates a cylinder 51 forming a portion of the rotation supporting shaft 53 in FIG. 5, and an opening 21B that accommodates a protrusion 52 disposed on a round surface of the cylinder 51.

Preferably, the insertion hole 21A has a smaller diameter on a periphery of the opening 21B than in the shaft outer protrusion hole 23. In one aspect, the insertion hole 21A communicates with the shaft outer protrusion hole 23 in a diameter direction through the opening 21B. The shaft outer protrusion hole 23 forms a step difference with the insertion hole 21A on the periphery of the opening 21B. Preferably, the protrusion 52 is rotated along the step difference between the shaft outer protrusion hole 23 and the insertion hole 21A. Meanwhile, the shoulder protrusion 25 partially covers the ring unit 24, and has a convex shape on a periphery of the ring unit 24.

Figure 3:
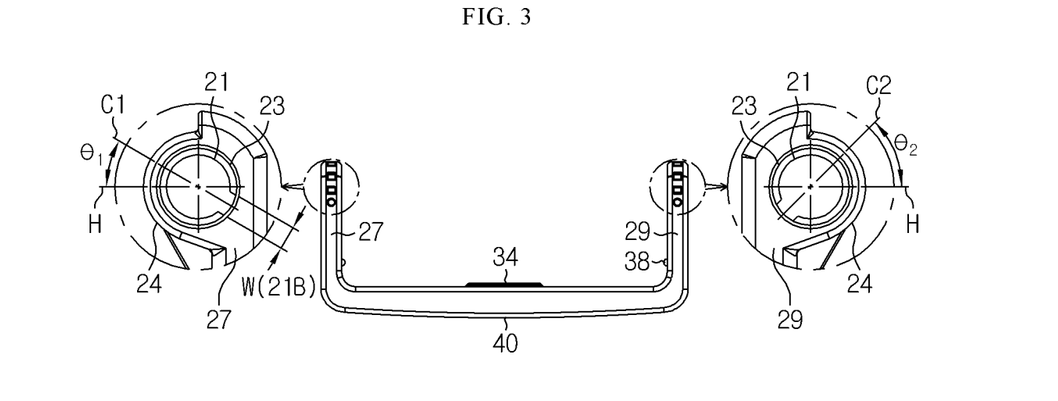
FIG. 3 is a plan view illustrating in detail the handle unit in FIG. 1.

FIG. 3 is a plan view illustrating in detail the handle unit in FIG. 1.

Referring to FIG. 3, at the handle unit 40, the opening 21B of the shaft insertion hole 21 is arranged in different positions along the edge of the shaft outer protrusion hole 23 in one shaft hook 27 and in the remaining shaft hook 29.

More specifically, a first angle θ1 between a horizontal line H going through a center of the shaft insertion hole 21 and a straight line C1 simultaneously going through centers of the shaft insertion hole 21 and the opening 21B in said one shaft hook 27 has a different magnitude from a second angle θ2 between a horizontal line H going through the center of the shaft insertion hole 21 and a straight line C2 simultaneously going through centers of the shaft insertion hole 21 and the opening 21B in the remaining shaft hook 29.

Preferably, the first angle θ1 has a smaller magnitude than the second angle θ2. In one aspect, the opening 21B has a same width W in said on shaft hook 27 and in the remaining shaft hook 29. Meanwhile, the handle unit 40 includes a grip unit 34 in a central region in order to improve a sense of gripping. The grip unit 34 may be accommodated inside the sync groove 55 in FIG. 1 or disposed on a periphery of the sync groove 55.

Figure 4:
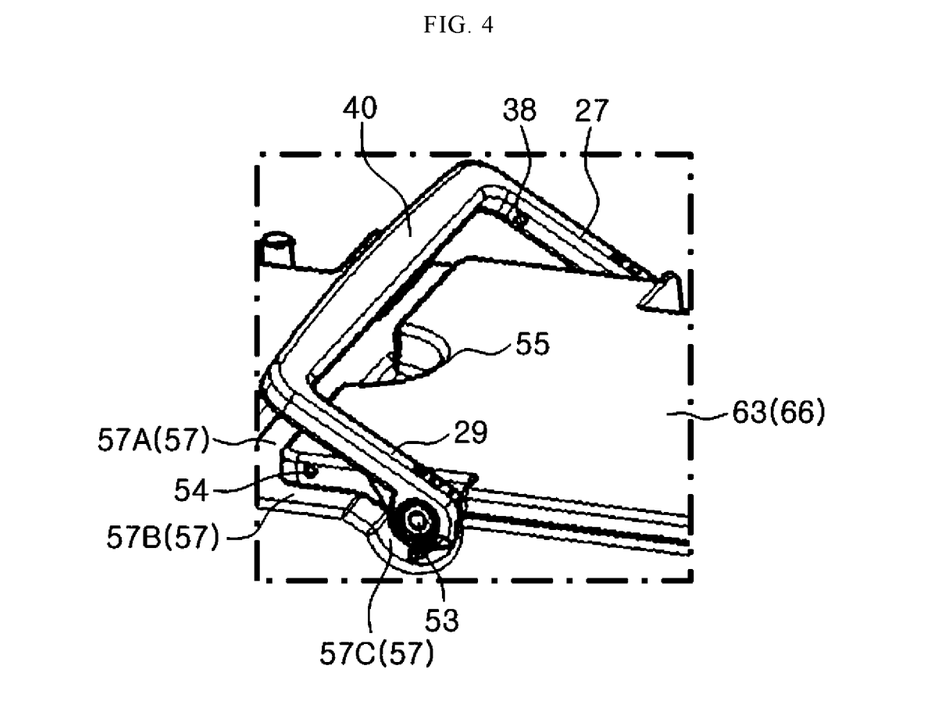
FIG. 4 is a partial perspective view illustrating a coupling relation of an upper case and the handle unit in FIG. 1.
Figure 5:
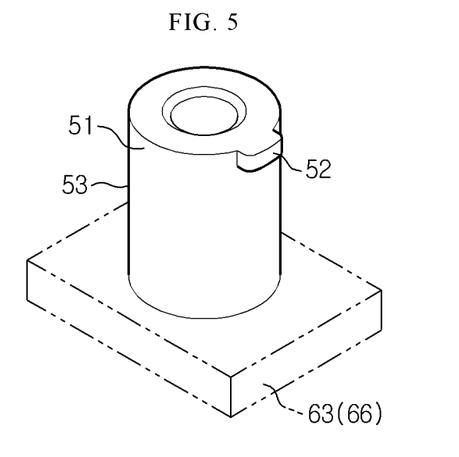
FIG. 5 is a schematic view illustrating a rotation supporting shaft on the upper case in FIG. 1.

FIG. 4 is a partial perspective view illustrating a coupling relation of the upper case and handle unit in FIG. 1, and FIG. 5 is a schematic view illustrating the rotation supporting shaft in FIG. 1.

Referring to FIG. 4 and FIG. 5, the upper case 66 includes the housing 63 and the handle unit 40 that is rotated relatively with respect to the housing 63 and is seated on the housing 63. The housing 63 has the rotation supporting shafts 53 each disposed at the edges that it faces, and a landing lane 57 formed along a seating shape of the handle unit 40 starting from a direct periphery of the rotation supporting shafts 53.

As illustrated in FIG. 5, each of the rotation supporting shafts 53 protrudes as a cylinder 51 from the housing 63 towards a side portion of the housing 63, and has a protrusion 52 on a round surface of the cylinder 51 at an opposite side of the housing 63. The landing lane 57 includes a line groove 57A of the housing 63 in a central region, and is formed in a hook shape having a straight line surface 57B connected to the line groove 57A at the edge and a semicircular surface 57C extending from the straight line surface 57B and surrounding the rotation supporting shaft 53.

Further, the housing 63 includes the semi-circular sync groove 55 in a direction perpendicular to the extending direction of the landing lane 57 so that it communicates with the central region of the landing lane 57 on a periphery of the landing lane 57. Meanwhile, the housing 63 includes snap grooves 54 each disposed at a same level as the rotation supporting shafts 53. Here, the handle unit 40 includes snap protrusions 38 each coupled to each of the snap grooves 54 at the shaft hooks 27, 29, as illustrated in FIG. 3.

Figure 6:
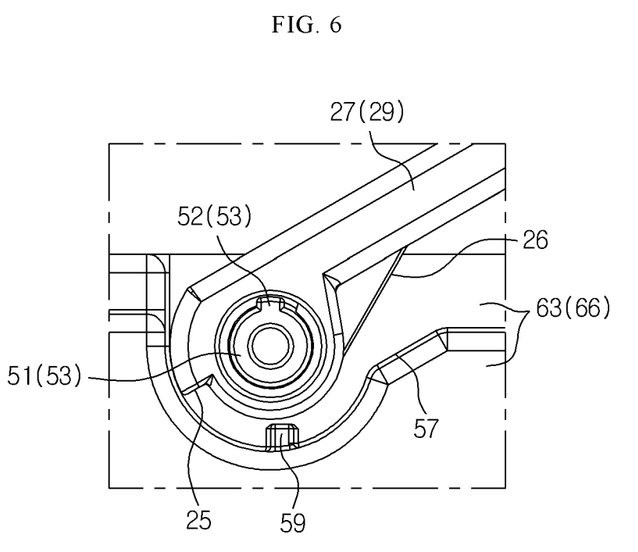
FIG. 6 is a partial side view illustrating a coupling relation of the upper case and the handle unit in FIG. 1.

FIG. 6 is a partial side view illustrating a coupling relationship of the upper case and the handle unit in FIG. 1.

Referring to FIG. 6, on the housing 63 of the upper case 66, the handle unit 40 has the shaft hooks 27, 29 that are penetrated by the rotation supporting shafts 53 on the landing lane 57 of the housing 63 and that are each rotary-coupled to each of the rotation supporting shafts 53 in different angles. More specifically, the rotation supporting shafts 53 are fixatedly disposed on surfaces each facing an opposite direction from the housing 63.

Here, each of rotation supporting shafts 53 has the cylinder 51 and the protrusion 52, as illustrated in FIG. 5, and the protrusion 52 protrudes from the rotation supporting shaft 53 towards an upper portion of the housing 63. Further, the shaft hooks 27, 29 have openings 22B along the edges of the shaft outer protrusion holes 23 in the ring unit 24, as illustrated in FIG. 3. The openings 22B are each formed in different positions at the edges of the shaft outer protrusion holes 23, when seeing the shaft hooks 27, 29 in an overlapping manner from a side view through FIG. 2 or FIG. 3.

Therefore, the shaft hooks 27, 29 are not simultaneously coupled to the rotation supporting shafts 53 through a same direction, but are slightly rotated with respect to each other and coupled to the rotation supporting shafts 53. Meanwhile, each of the shaft hooks 27, 29 includes a stabilizing unit 26 on a periphery of the ring unit 24 at an opposite side of the shoulder protrusion 25. Each of the shaft hooks 27, 29 contacts the landing lane 57 through the stabilizing unit 26 on a periphery of the rotation supporting shaft 53.

Further, the housing 63 includes rotation stoppers 59 on the landing lane 57 below the rotation supporting shafts 53. Here, each of the shaft hooks 27, 29 has the shoulder protrusions 25 on a periphery of the ring units 24. Preferably, the shoulder protrusions 25 are disposed between the landing lane 57 and the ring units 24 through the coupling of the shaft hooks 27, 29 and the rotation supporting shafts 53. Each of the shoulder protrusions 25 contacts each of the rotation stoppers 59 by spacing of the handle unit 40 from the landing lane 57.

Figure 7:
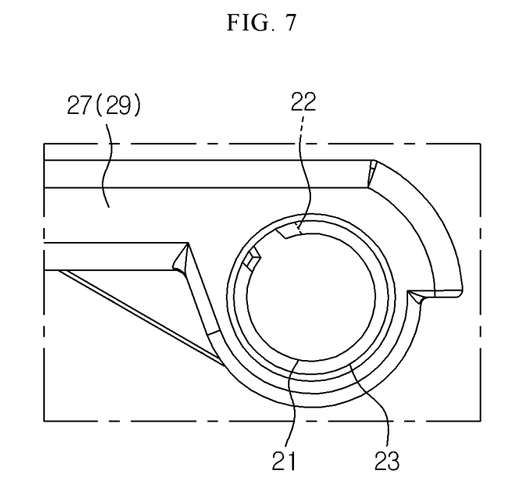
FIGS. 7 and 8 are schematic views provided to explain a method for assembling the battery pack in FIG. 1.
Figure 8:
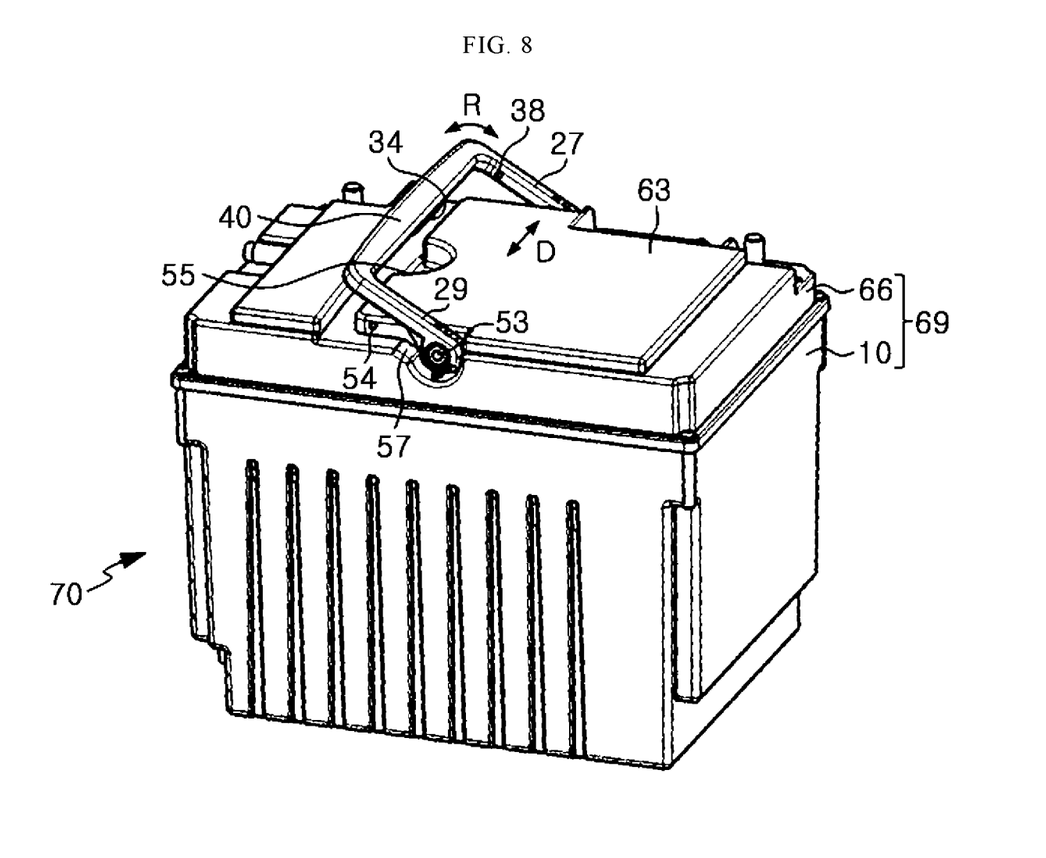

FIGS. 7 and 8 are schematic views provided to explain a method for assembling the battery in FIG. 1.

Referring to FIG. 7 the battery module 8, the lower case 10, the handle unit 40 and the housing 63 may be prepared as in FIG. 1. The battery module 8 may be accommodated in the lower case 10. Before the handle unit 40 is coupled to the housing 63, the following must be considered. That is, the handle unit 40 has the openings 21B that partially overlap each other at the edges of the shaft outer protrusion holes 23 of the ring units 24, when seeing the shaft hooks 27, 29 in an overlapping manner from a side view through FIG. 2 or FIG. 3.

Referring to FIG. 8, at the shaft hooks 27, 29 of the handle unit 40, each of the shaft hooks 27, 29 may be rotary-coupled to the rotation supporting shaft 53 of the housing 63 using the opening 21B of the shaft outer protrusion hole 23 of the ring unit 24. In this case, the shaft hooks 27, 29 may be moved in a rotating direction R and in a translation direction D, and may each be rotary-coupled to each of the rotation supporting shafts 53.

After the shaft hooks 27, 29 are rotary-coupled to the rotation supporting shafts 53, the handle unit 40 and the housing 63 may form the upper case 66. The upper case 66 may be disposed on the lower case 10 using the handle unit 40 and/or the housing 63. The lower case 10 and the upper case 66 may form the pack case 69.

Next, the handle unit 40 may be moved in the rotating direction R, and be seated on the landing lane 57 on the housing 63. In the process where the handle unit 40 is seated on the landing lane 57, the handle unit 40 may insert each of the snap protrusions 38 of the shaft hooks 27, 29 into each of the snap grooves 54 of the housing 63, and align the grip unit 34 between the shaft hooks 27, 29 on a periphery of the sync groove 55 of the housing 63. By doing this, the pack case 69 may form the battery pack 70 together with the battery module 8.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A battery pack comprising:
a lower case and an upper case stacked sequentially to encase a battery module, wherein the upper case comprises a housing and a handle unit relatively rotated with respect to the housing to be seated on the housing,
rotation supporting shafts each disposed on edges facing each other, each rotation supporting shaft having a protrusion at a distal end; and
a landing lane formed along a seated shape of the handle unit starting from a direct periphery of the rotation supporting shafts,
wherein the handle unit has a first shaft hook and a second shaft hook that are penetrated by respective rotation supporting shafts on the landing lane and that are each rotary-coupled to each of the rotation supporting shafts in different angles, the first shaft hook having a first shaft insertion hole, the first shaft insertion hole having a first opening and the second shaft hook having a second shaft insertion hole, the second shaft insertion hole having a second opening,
wherein the housing comprises snap grooves disposed at a same level as respective rotation supporting shafts, the snap grooves being spaced apart from the rotation supporting shafts,
wherein the handle unit comprises a snap protrusion coupled to each snap groove, the snap protrusions being spaced apart from the shaft hooks,
wherein a first plane passes through a center of each of the rotation supporting shafts, and
wherein the first opening is at a first angle to the first plane and the second opening is at a second angle to the first plane, the first angle being different than the second angle.

2. The battery pack of claim 1, wherein the rotation supporting shafts are fixated to the housing.

3. The battery pack of claim 1, wherein each of the rotation supporting shafts are disposed on surfaces each facing a direction opposite to the housing.

4. The battery pack of claim 1, wherein each of the rotation supporting shafts protrudes as a cylinder from the housing towards a side portion of the housing, and has a protrusion on a round surface of the cylinder at an opposite side of the housing.

5. The battery pack of claim 4, wherein the protrusion protrudes from the rotation supporting shaft towards an upper portion of the housing.

6. The battery pack of claim 1, wherein the landing lane includes a line groove of the housing in a central region, and is formed in a hook shape having a straight line surface connected to the line groove at the edge and a semi-circular surface extending from the straight line surface and surrounding the rotation supporting shaft.

7. The battery pack of claim 1, wherein the housing has a semi-circular sync groove in a direction perpendicular to an extending direction of the landing lane such that it communicates with a central region of the landing lane on a periphery of the landing lane.

8. The battery pack of claim 1, wherein each of the shaft hooks has a shaft insertion hole and a shaft outer protrusion hole arranged sequentially from the housing at an end.

9. The battery pack of claim 8, wherein the shaft insertion hole comprises an insertion hole that accommodates a cylinder forming a portion of the rotation supporting shaft, and an opening that accommodates a protrusion disposed on a round surface of the cylinder.

10. The battery pack of claim 9, wherein the insertion hole has a smaller diameter on a periphery of the opening than in the shaft outer protrusion hole.

11. The battery pack of claim 9, wherein the insertion hole communicates with the shaft outer protrusion hole in a diameter direction through the opening.

12. The battery pack of claim 9, wherein the shaft outer protrusion hole forms a step difference with the insertion hole on a periphery of the opening.

13. The battery pack of claim 9, wherein the opening has a same width in the shaft hooks.

14. The battery pack of claim 9, wherein the opening of the shaft insertion hole is arranged in different positions along the edge of the shaft outer protrusion hole in one shaft hook and in the remaining shaft hook.

15. The battery pack of claim 9, wherein the protrusion rotates along a step difference between the insertion hole and the shaft outer protrusion hole.

16. The battery pack of claim 1, wherein the housing comprises a rotation stopper on the landing lane below the rotation supporting shaft, the shaft hook comprises a ring unit surrounding the rotation supporting shaft at an end and a shoulder protrusion on a periphery of the ring unit, and the shoulder protrusion contacts the rotation stopper by spacing of the handle unit from the landing lane.

17. The battery pack of claim 16, wherein the shaft hook further comprises a stabilizing unit on a periphery of the ring unit at an opposite side of the shoulder protrusion, and contacts the landing lane through the stabilizing unit on a periphery of the rotation supporting shaft.

18. The battery pack of claim 1, wherein the handle unit comprises a grip unit on a central region in order to improve a sense of gripping.

\* \* \* \* \*